(No Model.) 2 Sheets—Sheet 1.
E. LATHROP.
ROAD SCRAPER.
No. 303,227. Patented Aug. 5, 1884.
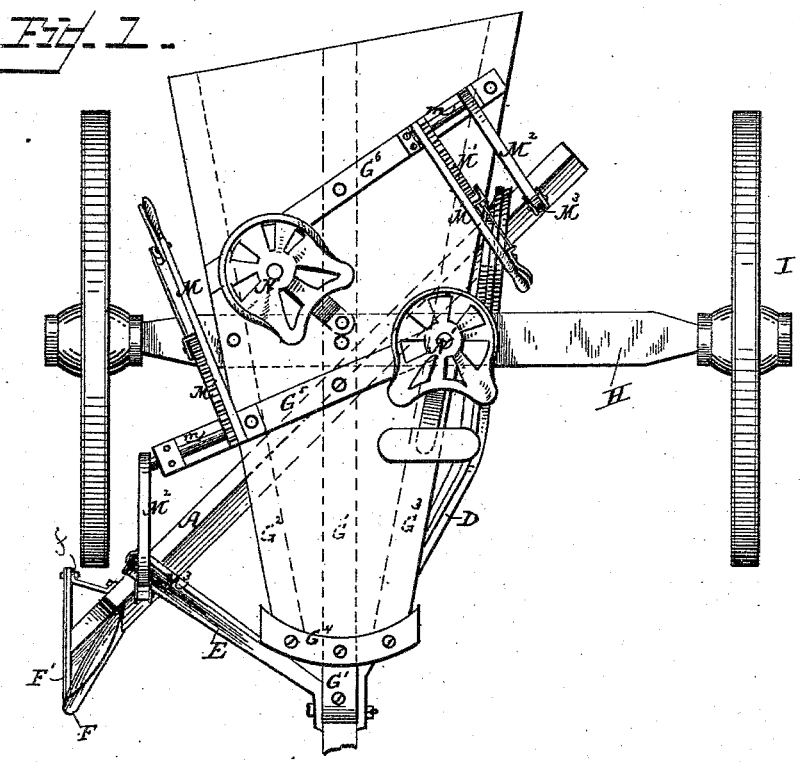
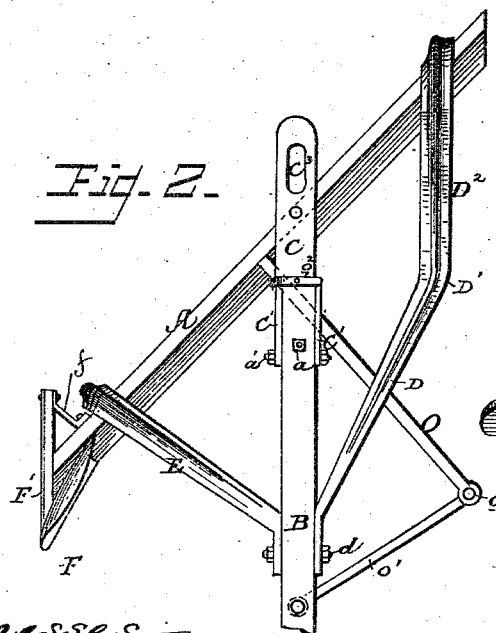
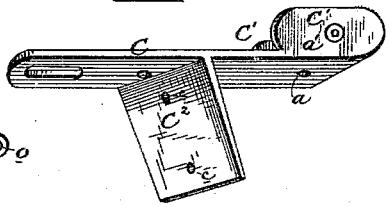
Witnesses:
Franck L. Durand
Geo. L. Rundel
Inventor:
Elias Lathrop
by A.M. Smith
atty.

(No Model.) 2 Sheets—Sheet 2.
E. LATHROP.
ROAD SCRAPER.
No. 303,227. Patented Aug. 5, 1884.
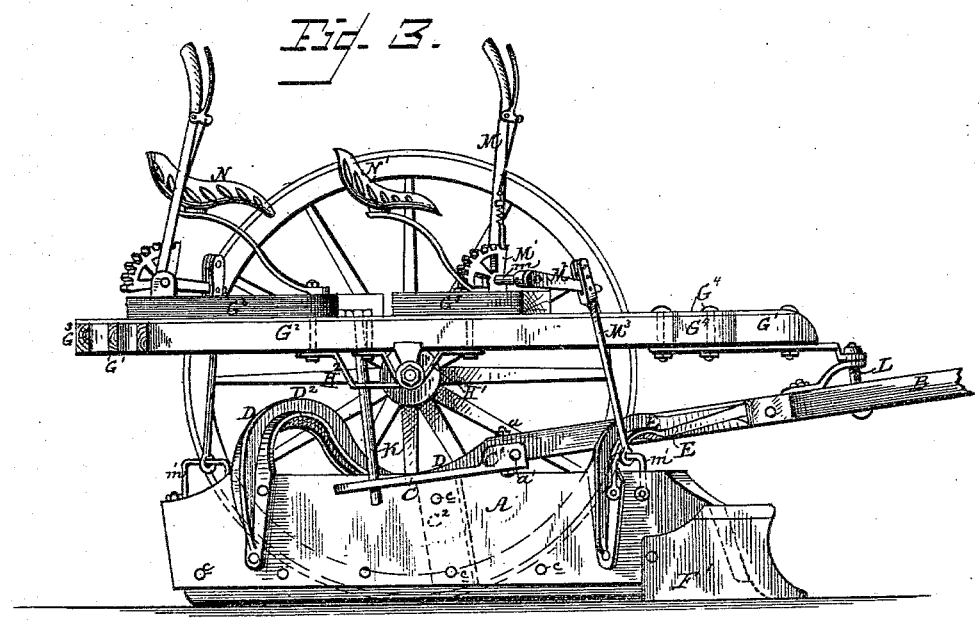
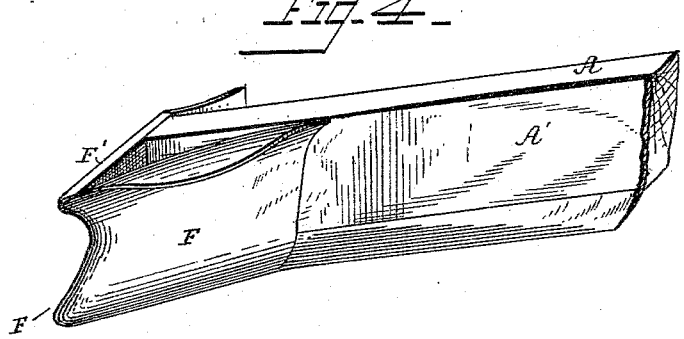
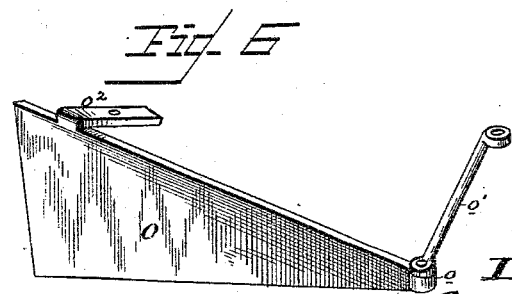
Witnesses:—
Franck L. Ourand
Geo. H. Randel
Inventor
Elias Lathrop
by A.M. Smith
Atty.

UNITED STATES PATENT OFFICE.

ELIAS LATHROP, OF FORT WAYNE, INDIANA, ASSIGNOR TO THE FLEMING MANUFACTURING COMPANY, OF SAME PLACE.

ROAD-SCRAPER.

SPECIFICATION forming part of Letters Patent No. 303,227, dated August 5, 1884.

Application filed March 15, 1884. (No model.)

*To all whom it may concern:*

Be it known that I, ELIAS LATHROP, of Fort Wayne, county of Allen, and State of Indiana, have invented a new and useful Improvement in Road-Scrapers, of which the following is a full, clear, and exact description, reference being had to the accompanying drawings, making part of this specification.

My invention relates to that class of machines wherein a scraper, arranged diagonally to the line of draft and connected rigidly to the tongue, is secured to and held beneath the axle and frame of a truck, and may be adjusted at its ends to any desired angle or elevation beneath the axle to give the required slope or grade to the road, or be raised completely from the ground when traveling from place to place.

The object of the first part of my invention is to connect the scraper directly to the tongue in a strong, simple, and effective manner, to overcome side draft, and to afford an open path and smooth scraper-surface over which the earth and sod may be moved without obstruction.

The object of the next part of my invention is to connect the scraper-frame to a truck-frame in a novel manner to admit of the adjustment and support of the former upon the latter, allow an open path in rear of the wheel for the discharge of earth from the scraper, and means for overcoming side draft due to the diagonal position of the scraper, and the peculiar mode of connecting the scraper-frame and truck-frame, above referred to.

The object of the next part of my invention is to form a scraper-point of novel construction, to be employed with a curved scraper-blade, arranged diagonally to the line of draft, the shape of the mold-board being such as to roll the earth and sod over in front of the machine and prevent it from banking up against the face of the scraper in a solid mass.

In the accompanying drawings, Figure 1 is a plan view of my improved machine; Fig. 2, a plan view of the scraper and scraper-frame detached from the truck, and showing the choker-plate attached to the scraper; Fig. 3, a side elevation of the machine; Fig. 4, a perspective view of the mold-board, showing its connection with the end of the scraper, a portion of which is broken away; Fig. 5, a perspective view of the plate which connects the end of the tongue with the scraper, and Fig. 6 a similar view of the choker-plate detached.

The scraper A is attached directly to the tongue B by a peculiarly-formed bracket-plate, C, and end braces, D E. The bracket-plate C is formed with side flanges, $C'$ $C'$, at its forward end, between which the rear end of the tongue snugly fits, and is securely held by a bolt, $a$, passing vertically, and bolt $a'$, passing horizontally, through the tongue and the end of the plate. The tongue A is held securely to the scraper at an angle inclined toward the front end of the scraper, and the scraper is arranged diagonally therewith and to the line of draft. The bracket-plate C is formed with a depending plate, $C^2$, arranged diagonally across its under surface, which fits in a mortise in the face of the scraper A, and is secured thereto by bolts $c$ $c$, which pass through the plate and scraper. The bracket-plate C projects to the rear of the scraper, and is formed with an elongated opening, $C^3$, through which the lower end of a bar, K, secured to the truck-frame, freely passes, as will hereinafter appear. The scraper is preferably formed of a heavy wooden board, A, having a metal plate, $A'$, bolted securely to its face upon the forward side thereof; and the bolts $c$ $c$, which pass through the board and plate, may be countersunk in the plate to provide a smooth surface over which the earth may pass without obstruction. The braces D and E are secured to the ends of the scraper A, and converge at the forward ends until they meet upon opposite sides of the tongue, to which they are securely held by a bolt, $d$, which passes through the tongue and through the ends of both braces. The rear ends of the braces D and E are bent downwardly to reach behind the scraper, and present thereto a broad bearing-surface. The brace D is of peculiar form, as shown clearly in Figs. 2 and 3, to firmly hold the rear end of the scraper, to offer no obstruction to the elevation of the scraper by coming in contact with the axle, and to give ample room for the passage beneath it and in front of the scraper of the earth and sod, which accumulates and projects at times above the rear end of the scraper in its passage from the machine. The peculiar form referred to consists of the horizontal curve D', upward curve D², and arch D³. The plate is also formed with a deep flange above and a smaller flange upon its under side, to give to it the required strength. The arrangement of the scraper diagonally to the line of draft tends to cause a side draft upon the tongue, and as the direction of pressure is at right angles to the surface of the scraper, a longitudinal thrust toward the forward end and a lateral pressure upon the rear end of the scraper toward the opposite side of the machine will be exerted thereupon, which forces we endeavor to overcome by the following described means, some of which are well known. The forward end of the scraper is provided with a curved cutter-point, F, and landside F' of peculiar form, as will hereinafter appear. The point enters and takes firm hold upon the earth, and the landside, which extends back some distance in rear of the forward end of scraper-board, is firmly secured thereto, and affords a broad abutting surface to press against the bank and resist the longitudinal thrust of the scraper, while the penetration of the curved scraper-point into the earth partly counteracts the pressure upon the rear end of the scraper at the opposite side of the line of draft. The tongue is secured by its brackets to the scraper at one side of the center and nearer the rear end of the scraper, which affords additional means for resisting the excessive lateral pressure upon the rear end of the scraper due to its diagonal arrangement, and to the accumulation of material scraped from the road-surface, as well as to a slight strain brought upon the rear end of the scraper by its attachment to one side of the center of the axle of the truck. The frame G of the truck is preferably formed of a central beam, G', and side beams, G² G³, which converge toward the front of the machine, and are bolted to a front cross-piece, G⁴, middle cross-piece, G⁵, and rear cross-piece, G⁶. The frame G is supported upon an axle, H, upon the ends of which are journaled the wheels I. The frame is secured to the axle upon one side of its central line, and nearest the wheel toward which extends the forward end of the scraper, the object of which is to leave a clear unobstructed space in front of the rear end of the scraper, and behind the adjacent or rear wheel of the truck, through which the earth may freely pass.

To effect a secure attachment of the scraper-frame to the truck-frame and admit of the adjustment of one upon the other, an iron strap, H', passes beneath the axle at either end, and is bolted firmly to the longitudinal beams G² G³ of the frame, and an iron bracket-strap, H², is similarly bolted to the central frame-beam, G', and serves both to hold the axle securely to the frame and form a support for a bar, K, which passes through and is firmly held at its upper end by the frame-timbers, and is arranged to project downwardly in rear of the axle. The lower end of bar K passes through the elongated opening C³ in the end of the tongue or bracket-plate C, and the forward end of the central frame-beam, G', is connected to the tongue B by the evener-bolt L.

The wheel-frame and scraper-frame are coupled together to prevent the lateral movement of one upon the other, but admit of the scraper being raised or lowered bodily, or either end adjusted independently, by the following described means: A hand-lever, M, secured to one end of rock-shaft m, is adjustably secured at any required position upon a toothed segment-bracket, M', secured to the cross-piece G⁵ of the frame, and an arm, M², upon the other end of said rock-shaft, is connected by a rod, M³, with the forward end of the scraper-board A, by which means the said forward end of the scraper-board and plow-point secured thereto may be raised or lowered. A similar arrangement of parts, designated by corresponding letters of reference, is provided for raising or lowering the rear end of the scraper. The lower ends of rods M³ are preferably connected to the scraper-board by short rods m', which pass through eyes in the lower ends of the rods M³, and are bolted at their downwardly-projecting ends to the scraper, by which means a limited movement of the scraper is permitted upon its connection to admit of its angular adjustment.

It will be seen from the above-described construction and arrangement that the tongue is secured to the scraper about one-third of its length from the rear end thereof, and tends to draw the tongue toward the forward end of the scraper, and the central frame-piece is secured to the axle of the truck at about one-third its length nearest the off wheel and forward end of the scraper, and tends to draw the tongue in the opposite direction away from the forward end of the scraper, and that these opposing forces, tending to turn the machine from its line of draft, will approximately balance each other, and at the same time admit of the arrangement of the rear wheel in such position relatively to the rear end of the scraper that no obstruction will be offered to the passage of material away from the scraper.

Two seats, N N', are secured to the frame-pieces G' G³ for the driver and an attendant for raising and lowering the scraper, and it will be seen that the weight of the men, as well as the weight of the frame, will be thrown mainly upon the off wheel, and may be brought more directly upon the forward end of the scraper to insure the entrance of the plow-point into the earth when it is desired to bring the utmost force to bear upon the plow in overcoming hard and unyielding soil. The weight of the machine and men will afford another element which may be varied in counterbalancing the machine to overcome side draft, and additional weight may be applied to the frame if it should be required.

The scraper is formed with a curved face, the lower edge being sharpened to present a cutting-edge to the earth, and the point or cutter F, at its forward end, is also curved at its lower edge to conform to the curvature of the scraper, and has its forward end curved forwardly into line parallel with the path of the machine and line of draft, or nearly so, and is sharpened to adapt it to readily cut its way through the opposing earth. The upper edge of said point F is also curved forwardly, as shown, for preventing the earth, when it is first cut, and while yet not broken up, from sliding up over the scraper, and for giving it a revolving movement, and causing it to turn over away from the face of the scraper, so that it will not adhere in solid masses and follow upwardly along the surface of the scraper, to become clogged with the framing tongue and braces, but will be disintegrated and rolled along in front of the scraper, and in the direction of its length, to its discharge at the end thereof in rear of the wheel.

When it is desired to carry the earth forward a greater distance than in the ordinary way, to level up undulating places and fill in deep ruts or depressions in the road, I employ a choker-board, O, suspended beneath the tongue, and arranged to abut at its rear end snugly against the face of the scraper-plate, and provided with an eye, o, at its forward end, which is connected by a link, o', with a bolt passing through the tongue. A plate, o², secured near the rear end of the scraper-board to project laterally from the upper edge thereof, to rest upon the tongue bracket-plate C in rear of the tongue, serves to hold the choker in place downwardly, or in either direction laterally. The tongue prevents it from being raised or lifted upwardly, and the link o' retains it at its proper angular position. The link may be of any desired length to determine the required angle at which the board is to be held.

Other means may be employed for connecting the choker-plate to the scraper in any desired position upon its face without departing from my invention.

The choker may be quickly attached to or detached from the machine, as its use is only for the special purposes above described.

The operation of the scraper will be readily understood. By beginning in the middle of a road to be made and driving back and forth the point and cutter in front of the right-hand or off wheel first make a smooth place or track for that wheel. The earth, taking a natural and easy flow backward, is deposited inside of the path of the left-hand or near wheel, unless it is desired to "level up," in which case the left-hand or rear end of the cutter is elevated as much or little as desired, to adapt it to an unevenness of the ground or the work to be executed. By driving down one side of the road and back on the other side close to the bank, with the forward end of the cutter or scraper depressed, and the rear end to suit the grade or slope required, the earth will be scraped from the sides and deposited in the middle of the road, and any excess of earth so deposited may, by applying the choker and readjusting the scraper to the proper level, be carried forward and deposited, whenever it may be desired, for filling in or removal to a more distant place.

I claim as my invention and desire to secure by Letters Patent—

1. In a road-scraper, the combination, with the scraper arranged diagonally to the line of draft, of the plow-point, mold-board, and land-side secured to its forward end, and a tongue attached to the scraper at about two-thirds of its length from the forward end, and the end braces connecting the scraper and tongue, substantially as described.

2. In a road-scraper, the combination of the scraper-board arranged diagonally to the line of draft, and suspended beneath a truck-axle, the tongue secured thereto, the brace D, and the brace E, curved beneath the axle, and curved in front of and above the face of the scraper-board, and secured directly to the rear side thereof, substantially as and for the purpose specified.

3. In a road-grader, the combination of the scraper arranged diagonally to the line of draft and suspended beneath the axle of a truck, the tongue coupled to the forward end of the frame, the bracket C, provided with a depending plate secured against the face of the scraper, and a rearwardly-projecting slotted plate, and the bar K, secured to and depending from the frame to engage in said slot, substantially as and for the purpose described.

4. In a road-grader, the scraper arranged diagonally to the line of draft and secured to a tongue at a point between the middle portion and rear end, in combination with and suspended beneath the axle of a truck in a plane between the center of the axle and the wheel toward which extends the forward end of the scraper, substantially as and for the purpose described.

5. In a road-grader, the scraper arranged obliquely to the line of draft, in combination with a tongue rigidly secured thereto at a point in rear of the center of the length of the scraper, or between said center and its rear end, and one or more oblique tongue-braces also rigidly connected with the scraper, substantially as described.

6. In a road-grader, the scraper arranged obliquely to the line of draft underneath the truck-axle, in combination with a tongue and tongue-braces rigidly secured to said scraper, and a supporting-truck carrying means for adjusting said scraper and propelled or drawn forward through its connection with the scraper-draft attachment, substantially as shown and described.

7. In a road-grader, the combination, with the obliquely-arranged scraper, of the cutter plate or point rigidly secured to the forward end of the scraper, said point being forwardly curved at its forward end into a plane parallel, or nearly so, with the line of draft, to form a cutting-edge at its lower edge, to conform to the curve of the scraper-plate, and at its upper edge to give the earth a rolling movement, substantially as described.

In testimony whereof I have hereunto set my hand this 16th day of February, A. D. 1884.

ELIAS LATHROP.

Witnesses:
   C. F. PFEIFFER,
   HERMAN MICHAEL.